| (12) | United States Patent | (10) Patent No.: | US 9,143,797 B2 |
|---|---|---|---|
| | He et al. | (45) Date of Patent: | Sep. 22, 2015 |

(54) LOSSY DATA COMPRESSION WITH CONDITIONAL RECONSTRUCTION REFINEMENT

(71) Applicant: RESEARCH IN MOTION LIMITED, Waterloo (CA)

(72) Inventors: Dake He, Waterloo (CA); Nguyen Nguyen, Waterloo (CA); Gaëlle Christine Martin-Cocher, Toronto (CA); David Flynn, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 325 days.

(21) Appl. No.: 13/904,062

(22) Filed: May 29, 2013

(65) Prior Publication Data

US 2014/0355675 A1    Dec. 4, 2014

(51) Int. Cl.
*H04N 19/50* (2014.01)

(52) U.S. Cl.
CPC ...................................... *H04N 19/50* (2014.11)

(58) Field of Classification Search
None
See application file for complete search history.

(56) References Cited

U.S. PATENT DOCUMENTS

| 7,936,818 B2 | 5/2011 | Jayant et al. | |
|---|---|---|---|
| 2006/0133503 A1 | 6/2006 | Park et al. | |
| 2013/0034158 A1* | 2/2013 | Kirchhoffer et al. | .... 375/240.12 |
| 2013/0195180 A1* | 8/2013 | Hsiang | ..................... 375/240.12 |

FOREIGN PATENT DOCUMENTS

| WO | 2008049446 | 5/2008 |
|---|---|---|
| WO | 2009003499 | 1/2009 |
| WO | 2010127692 | 11/2010 |
| WO | 2011127964 | 10/2011 |

OTHER PUBLICATIONS

Extended Eurpoean Search Report dated Nov. 8, 2013.
Siu W C et al.: "On the Architecture of H.264 to H.264 Homogeneous Transcoding Platform", dated Jun. 7, 2008, XP031298782.
Schwartz H et al.: "Overview of the Scalable Video Coding Extension of the H.264/AVC Standard" dated Sep. 1, 2007, XP011193019.

* cited by examiner

*Primary Examiner* — Jeremiah C Hallenbeck-Huber
*Assistant Examiner* — Nam Pham
(74) *Attorney, Agent, or Firm* — Rowand LLP

(57) ABSTRACT

Methods of encoding and decoding media, for example video, using conditional reconstruction refinement are described. The encoding and decoding relies upon predictions that are based on previously encoded and decoded samples. Prediction information identifies the previously reconstructed samples upon which a prediction is to be based and is available to both the encoder and decoder. On the basis that a previously-reconstructed sample is going to be used as source data for a prediction, the encoder refines that reconstructed sample, uses the refined reconstructed sample for the prediction, and encodes refinement data to enable the decoder to also refine the previously-reconstructed sample during decoding. In some cases, a reconstructed sample may be refined more than once. Various flags or bits may be used to signal when refinement is enabled or disabled and may be signaled at various hierarchical points in the coding structure.

38 Claims, 11 Drawing Sheets

LOSSY DATA COMPRESSION WITH CONDITIONAL RECONSTRUCTION REFINEMENT

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices that employ conditional refinement of reconstructed data.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. Among the standards used for video encoding and decoding is the ITU-T H.264/AVC video coding standard. The next-generation video encoding standard that is currently being finalized through a joint initiative of MPEG-ITU termed High Efficiency Video Coding (HEVC) or H.265.

H.264/AVC and HEVC/H.265, like many data compression processes, rely on predictive coding so as to compress data by exploiting redundancies in the data. Some predictions are spatial, meaning that data within an image/frame/picture is used as the basis for predicting data elsewhere within the image/frame/picture. This predictive operation exploits uniformity in the image or picture. Some predictions, at least in the case of video, are temporal, meaning that data in one frame/picture is used as the basis for predicting data in a temporally nearby frame/picture. This predictive operation exploits similarities in a sequence of pictures or images. Predictive coding is also used in many image and audio coding processes.

In a predictive encoding process a prediction generator creates a prediction for current source data based on previously-reconstructed data; that is, previous source data that has been encoded and then decoded. The prediction is subtracted from the original source data and, because the prediction may not exactly match the original source data, a residual may result. The bitstream of encoded data contains the encoded residual and some additional information. The additional information may include prediction information that ensures that the encoder and decoder arrive at the same prediction. In many coding processes, at least some portion of the encoding process is lossy, meaning that the residual data reconstructed at the decoder may contain distortion. The reconstructed data is generated by adding the reconstructed residual data to the prediction, thereby incorporating the distortion into the reconstructed data.

Many coding schemes try to improve the distortion by using processes or analysis that results in a more optimal trade-off between rate and distortion. Some coding schemes try to improve the distortion by applying post-processing techniques, like deblocking or smoothing filters, although these techniques are outside the coding loop.

Distortion in many coding schemes, such as H.264/AVC or HEVC/H.265, results from quantization. This quantization affects the pixels that are reconstructed from the data that has been quantized and inverse quantized. However, because of the prediction loop, when reconstructed pixels are used as the source for a prediction they tend to result in larger (or more non-zero) residuals, which in turn means additional data that is quantized, thereby propagating the distortion.

It would be advantageous to realize encoding and decoding processes that mitigate the propagation of distortion error.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
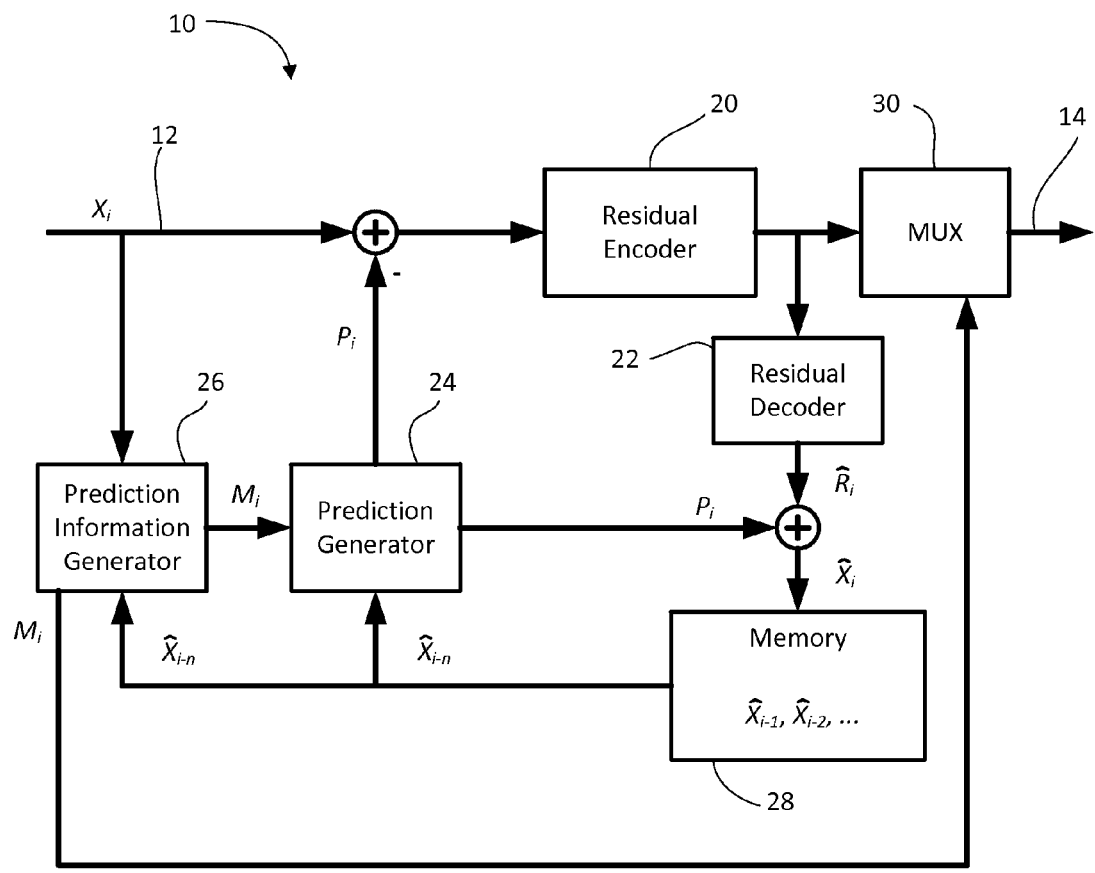
FIG. 1 shows, in block diagram form, a conventional predictive media encoder.

The present application describes methods of encoding and decoding data, for example video, using conditional reconstruction refinement. The encoding and decoding relies upon predictions that are based on previously encoded and decoded samples. Prediction information identifies the previously-reconstructed samples upon which a prediction is to be based and is available to both the encoder and decoder. On the basis that a previously-reconstructed sample is going to be used as source data for a prediction, the encoder refines that reconstructed sample, uses the refined reconstructed sample for the prediction, and encodes refinement data to enable the decoder to also refine the previously-reconstructed sample during decoding. In some cases, a reconstructed sample may be refined more than once. Various flags or bits may be used to signal when refinement is enabled or disabled and may be signaled at various hierarchical points in the coding structure.

In a first aspect, the present application describes a method of decoding data from a bitstream of encoded data using a decoder. The method includes decoding residual data for a first set of samples and reconstructing the first set of samples to produce a set of reconstructed samples; decoding prediction information for a second set of samples; and, determining that the prediction information specifies a prediction operation involving one of the reconstructed samples from the set of reconstructed samples. Based on that determination, the decoder decodes refinement data for that reconstructed sample, and modifies that reconstructed sample using the refinement data to produce a refined reconstructed sample.

The present application further discloses a method of encoding source data using an encoder. The method includes encoding residual data for a first set of samples from the source data; decoding the residual data and reconstructing the first set of samples to produce a set of reconstructed samples; and selecting prediction information for a second set of samples, wherein the prediction information specifies a prediction operation involving one of the reconstructed samples from the set of reconstructed samples. Based on that determination, the encoder generates refinement data for that reconstructed sample from said first set of samples, encodes and decodes that refinement data to obtain reconstructed refinement data, and modifies that reconstructed sample using the reconstructed refinement data to produce a refined reconstructed sample.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264/AVC standard for video coding and/or the newly-developed HEVC/H.265 standard. Those ordinarily skilled in the art will understand that references to H.264/AVC or HEVC/H.265 are for illustration and are not meant to suggest that the present application is limited to modifications to those standards. The present application describes encoding and decoding methods and devices that may be incorporated as a part of possible future video coding standards, multi-view coding standards, scalable video coding standards, and reconfigurable video coding standards.

It will also be appreciated that the present application is not limited to video coding, but may be applied to other media, including the coding of images or audio.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. A series of frames/pictures may be called a "sequence" or "Group of Pictures" (GoP) in some cases. Other terms may be used in other video coding standards. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, depending on the implementation, the operations described below may be performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to coding tree units, coding units, prediction units, transform units, etc., as will become apparent in light of the description below.

The media data being encoded and decoded may relate to video, audio, images, or other information. The source image or video data may be pixels (or voxels in the case of 3-D imaging/video). The source audio data may be audio samples. In the description herein the terms "data", "data point" or "sample" may be used interchangeably to refer to the source data, irrespective of whether it is video, image, or audio data.

Figure 2:
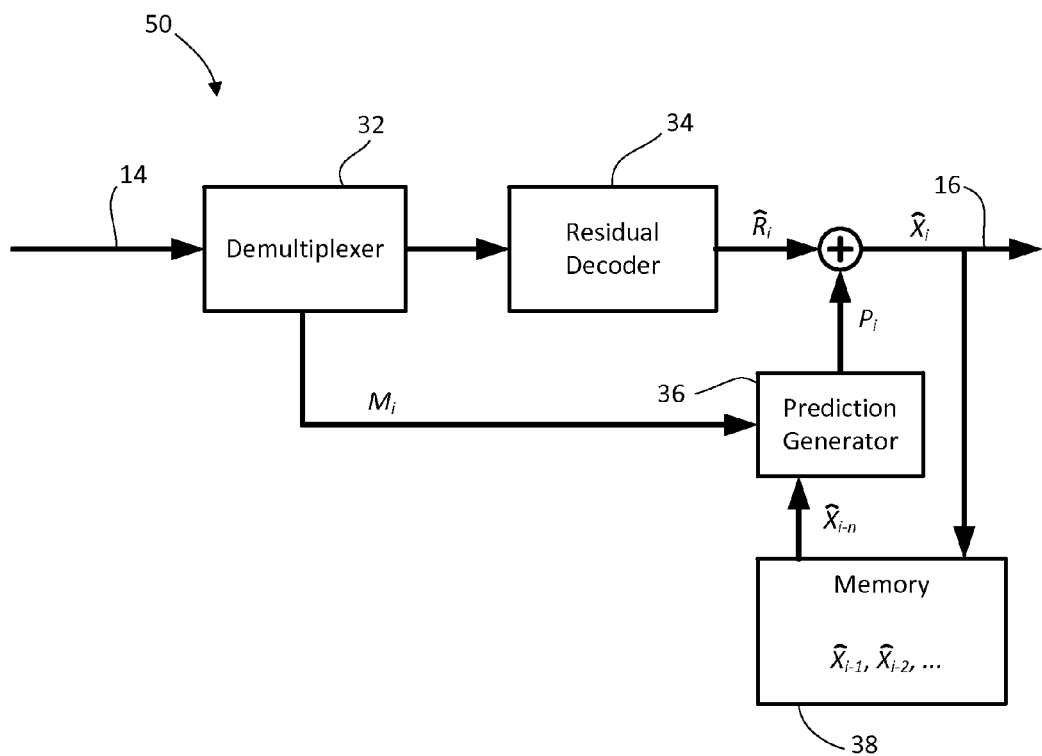
FIG. 2 shows, in block diagram form, a conventional predictive media decoder.

Reference is now made to FIG. 1, which shows, in block diagram form, an encoder 10 for encoding media using a predictive coding process. Reference is also made to FIG. 2, which shows a block diagram of a decoder 50 for decoding encoded media using the predictive coding process. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a data source 12, labeled $X_i$, and produces an encoded bitstream 14. The source $X_i$, may be, for example, pixel data for an image, pixel data for a video, audio samples, or some other original data. The index i is intended to indicate that the source $X_i$ is a "current" set of samples to be encoded, such as a block of pixels, a window of audio samples, a non-rectangular set of pixels, etc.

The decoder 50 receives the encoded bitstream 14 and outputs reconstructed source data 16, labeled $\hat{X}_i$. The notation "^" over the source symbol is intended to indicate that this data has been reconstructed from the encoding-decoding process and, as such, may contain distortion.

The encoder 10 includes a residual encoder 20, a residual decoder 22, a prediction generator 24, a prediction information generator 26, and memory 28. The source $X_i$ is converted to a residual $R_i$ by subtracting a prediction $P_i$ from the source $X_i$. The residual is then encoded by the residual encoder 20.

The predictive feedback loop then decodes the encoded residual using the residual decoder 22 to obtain a reconstructed residual $\hat{R}_i$. The reconstructed residual $\hat{R}_i$ is then added to the same prediction $P_i$ to create the reconstructed source data $\hat{X}_i$. That reconstructed source data $\hat{X}_i$ is stored in the memory 28. The memory 28 contains previously-reconstructed data, e.g. $\hat{X}_{i-1}, \hat{X}_{i-2}, \ldots$. Note that the previously-reconstructed data $\hat{X}_{i-1}, \hat{X}_{i-2}, \ldots$ does not necessarily refer to previously-reconstructed frames/pictures in a video sequence; it may also include previously-reconstructed pixel data from the same picture/image in the case of video/image coding.

The prediction $P_i$ is a prediction of the source data for index i generated by the prediction generator 24. The prediction generator 24 uses some previously-reconstructed data, $\hat{X}_{i-n}$, to generate the prediction. In this example, the prediction information generator 26 determines how to make the prediction and (in some cases) what previously-reconstructed data will serve as the source for the prediction. The prediction information generator 26 may make this decision based upon the current source data $\hat{X}_i$ and the history of the source, i.e. the previously-reconstructed data from the memory 28. As an example, with reference to video coding, the prediction information generator 26 may determine whether to use intra-coding or inter-coding, and select an intra-coding mode or reference frame and motion vector(s). The details of the various possible predictive operations are not germane to the present description and will not be detailed here. Likewise, there are various mechanisms, including rate-distortion optimization-based searches, for selecting a mode, motion vector, etc., but the details of those various mechanisms are not relevant to the present application. The prediction information generator 26 outputs "prediction information" $M_i$, which is then used by the prediction generator 24 as "instructions" for producing the prediction $P_i$.

The prediction information $M_i$ is sent to the decoder 50 along with the encoded residual data. A multiplexer 30 is shown to indicate that the encoded residual data and prediction information are combined to form the bitstream 14 of encoded data. Although not illustrated, it will be appreciated that the prediction information may also be encoded prior to being incorporated into the bitstream 14 by the multiplexer 30.

At the decoder 50, the bitstream 14 is disaggregated by a demultiplexer 32, which extracts the prediction information $M_i$ and the encoded residual data. As noted above, the prediction information $M_i$ may be encoded, in which case a decoding operation would be applied to recover the prediction information $M_i$. A residual decoder 34 decodes the encoded residual data to produce reconstructed residual data $\hat{R}_i$. Using a prediction generator 36, a prediction $P_i$ is created based upon the prediction information $M_i$ and the previously-reconstructed data $\hat{X}_{i-1}, \hat{X}_{i-2}, \ldots$ stored in memory 38. This is the same prediction $P_i$ generated at the encoder 10 to produce the residual data $R_i$. At the decoder 50, this prediction $P_i$ is added to the reconstructed residual data $\hat{R}_i$ to produce the reconstructed source data $\hat{X}_i$. The reconstructed source data $\hat{X}_i$ is then output and is stored in the memory 38 for possible use in subsequent prediction operations.

It will be appreciated that the prediction-based coding process results in the output and storage of distorted reconstructed source data. That distorted reconstructed source data may be used as the basis for subsequent predictions. It would be advantageous to reduce the amount of distortion in reconstructed data that is used for subsequent predictions. One simple approach is to reduce distortion for all data, for example by using smaller quantization step sizes, but that imposes a rate cost. Another approach is to reduce the distortion for those portions of the data that are used as the basis for subsequent predictions, but this requires knowledge of what will occur in future coding operations in order to make coding decisions for current source data. There are two mechanisms that have been tried to make better coding decisions in this nature: joint optimization and multi-loop coding. In joint optimization, coding decisions are delayed while various permutations and combinations are tried over a large data set (e.g. a frame, a slice, a GoP, etc.). Joint optimization can be very computationally demanding and introduce unacceptable delay. In multi-loop coding, source data is encoded in a first pass, and then re-encoded with knowledge of the results of the first pass encoding. Although not necessarily as computationally demanding as joint optimization, multi-loop coding introduces significant delay as the same data is encoded and re-encoded, possibly multiple times. The re-encoding may also be sub-optimal since changes in coding decisions in a sequence of source data may invalidate the "knowledge" about later coding decisions that was gained in the previous encoding pass.

The present application proposes a new approach to predictive coding labeled "conditional reconstruction refinement" (CRR). In CRR, knowledge about the prediction information $M_i$ is leveraged to make possible improvements to previously-reconstructed source data. Put another way, if previously-reconstructed source data is identified as being the basis for predicting future source data, then the previously-reconstructed source data may be refined so as to improve the quality (reduce the distortion) of that data. In this approach, after reconstruction and storage of some portion of source data, the portion of source data is determined to be useful in a prediction operation. The reconstructed data is then changed, i.e. refined, prior to it being used in the prediction operation. That refined reconstructed source data may replace the first reconstruction of that data in the memory at both the encoder and the decoder. Refinement data may be sent in the bitstream from the encoder to the decoder to enable the decoder to apply the same refinement operation to the reconstructed source data that is applied at the encoder. In some embodiments, the same data may be refined more than once.

Note that the refinement of previously-reconstructed samples is not a re-encoding/decoding operation, but rather a refinement operation. The encoder and decoder do not retroactively go back and change previous encoding/decoding decisions like in a multiple-pass system. Instead, during the encoding/decoding of a subsequent sample, the encoder and decoder refine a previously-reconstructed sample based on the fact that the reconstructed sample has been identified as being the basis for a prediction of the subsequent sample. Therefore, the delay common to multiple-pass systems is not a concern with CRR.

Figure 3:
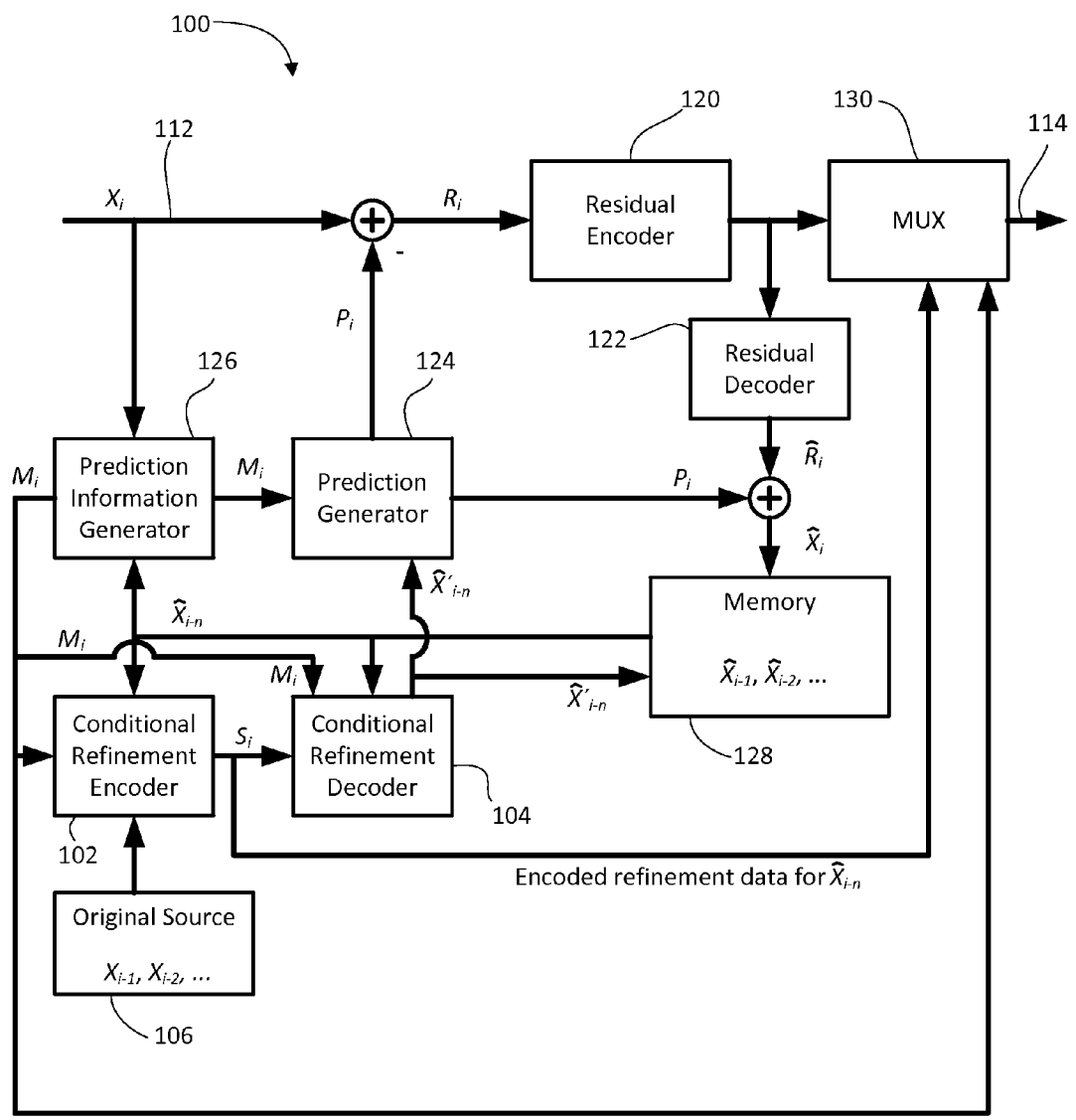
FIG. 3 shows, in block diagram form, an example of an encoder with conditional reconstruction refinement.

Reference is now made to FIG. 3, which shows a block diagram of one example embodiment of a CRR-capable encoder 100. The encoder 100 includes a residual encoder 120, a residual decoder 122, memory 128, a prediction generator 124 and a prediction information generator 126. The prediction information generator 126 generates prediction information $M_i$ for encoding a set of samples $X_i$. The prediction information $M_i$ relies upon at least one previously-reconstructed sample $\hat{X}_{i-n}$ from the memory 128. A prediction $P_i$ is generated by the prediction generator 124 and subtracted from the source set of samples $X_i$ to arrive at the residual data $R_i$.

The encoder 100 also includes a conditional refinement encoder 102 and a conditional refinement decoder 104. The conditional refinement encoder 102 receives the prediction information $M_i$ and previously-reconstructed samples $\hat{X}_{i-n}$. It also has access to original source samples ($X_{i-1}, X_{i-2}, \ldots$). The conditional refinement encoder 102 identifies the reconstructed samples $\hat{X}_{i-n}$ based on the prediction information $M_i$, and determines whether to refine those reconstructed samples. Example details of this determination are provided later below; however, in one embodiment the encoder 100 may be configured to refine the reconstructed samples $\hat{X}_{i-n}$ based solely on the fact that they are used in a prediction operation as indicated by the prediction information $M_i$. In other embodiments, additional factors may be taken into account by the conditional refinement encoder 102 in determining whether to refine the reconstructed samples $\hat{X}_{i-n}$.

The conditional refinement encoder 102 generates refinement data for refining the reconstructed samples $\hat{X}_{i-n}$. That refinement data is encoded by the conditional refinement encoder 102 and is sent to a multiplexer 130 for incorporation into the bitstream 114 of encoded data for transmission to the decoder. The encoded refinement data, labeled $S_i$, is also then decoded by the conditional refinement decoder 104 to obtain reconstructed refinement data $\hat{S}_i$ (since the encoding of the refinement data may be a lossy operation and the encoder uses the same reconstructed refinement data that will be available to the decoder). The conditional refinement decoder 104 also applies the reconstructed refinement data to the reconstructed samples $\hat{X}_{i-n}$ to produce refined reconstructed samples $\hat{X}'_{i-n}$. Here the prime symbol is used to indicate that the samples have been refined, i.e. modified, in some manner by application of the refinement data. Those refined reconstructed samples $\hat{X}'_{i-n}$ are then stored in the memory 128 and are provided to the prediction generator 124 to be used in generating the prediction $P_i$ for predicting $X_i$.

Accordingly, the output bitstream 114 for reconstructing samples $X_i$ will include encoded residual data, prediction information $M_i$ (which may be encoded too), and encoded refinement data $S_i$. The residual data $R_i$ is generated based on the original samples $X_i$ and the prediction $P_i$, where the prediction $P_i$ is generated based on the prediction information $M_i$ and refined reconstructed samples $\hat{X}'_{i-n}$.

Figure 4:
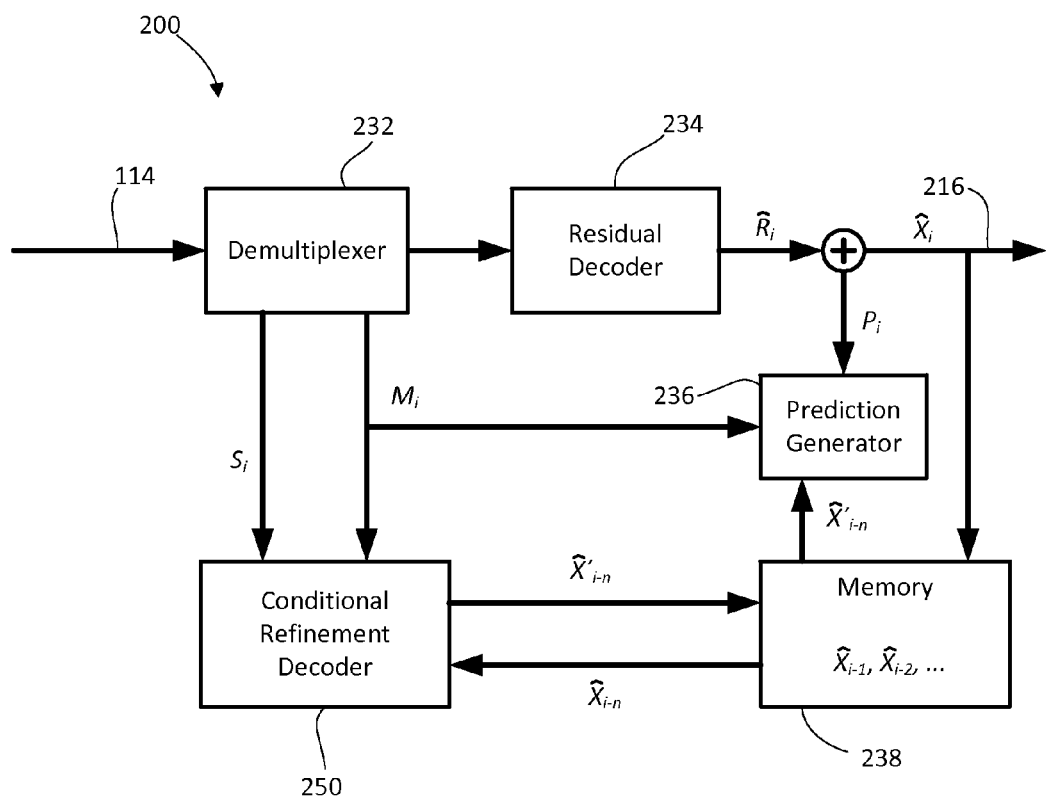
FIG. 4 shows, in block diagram form, an example of a decoder with conditional reconstruction refinement.

Reference is now made to FIG. 4, which shows a block diagram of one example embodiment of a CRR-capable decoder 200. The decoder 200 receives the bitstream 114 of encoded data and outputs reconstructed samples 216. A demultiplexer 232 separates the encoded residual data from the encoded refinement data $S_i$ and the prediction information $M_i$. The encoded residual data is decoded by a residual decoder 234 to produce reconstructed residual data $\hat{R}_i$. The prediction information $M_i$ and the refinement data $S_i$ are provided to a conditional refinement decoder 250. The conditional refinement decoder 250 has access to previously-reconstructed samples $\hat{X}_{i-1}, \hat{X}_{i-2}, \ldots$. Based on the prediction information $M_i$ the conditional refinement decoder 250 identifies the previously-reconstructed samples $\hat{X}_{i-n}$ that are required for generating the prediction $P_i$.

Although not illustrated in the diagram, the prediction information $M_i$ may be the basis upon which the decoder 200 determines that it should demultiplex/decode refinement data from the bitstream. That is, the decoder 200 may determine from the prediction information $M_i$ whether there is refinement data in the bitstream 114 for use in refining the reconstruction data to be used in the current prediction operation.

As a generalization, consider that the symbols $X_1, X_2, \ldots, X_n \ldots$ denote a source with memory. The reconstruction of that source is $\hat{X}_2, \hat{X}_2, \ldots \hat{X}_n, \ldots$. The encoding of the source is done on the basis of sets of samples. Each set is of length N, with N>1. In some cases, a set of samples may be a block of samples, for example an image or a video frame may be partitioned into blocks for encoding and decoding. The present application is not limited to image/videos or block-based coding, but some examples herein may refer to blocks of pixel data as an example.

The i-th length-N set of samples is denoted $X_{N(i-1)+1}, \ldots, X_{Ni}$. This set of samples is predicted using a prediction operation that generates prediction $P_i$. Prediction $P_i$ is based on reconstructed sample(s) $\hat{X}_{M_i}$, where $M_i$ denotes the prediction information that identifies the reconstructed sample(s) used in the prediction operation. In particular, in this example $M_i$ denotes side information that takes value in $\{1, 2, \ldots, N(i-1)\}$. The residual is calculated based on an operation involving the original source set of samples, $X_{N(i-1)+1}, \ldots,$ $X_{Ni}$, and the prediction $P_i$. In one case, that operation is the subtraction of the predicted sample from the actual sample:

$$R_{N(i-1)+j} = X_{N(i-1)+j} - P_{i,j}, j=1, \ldots, N$$

In this case, however, the encoder improves the prediction $P_i$ by refining the reconstructed sample(s) $\hat{X}_{M_i}$ on which it is based to produce refined reconstructed samples $\hat{X}'_{M_i}$. This operation of refining the reconstructed samples is based upon the prediction information $M_i$. The prediction information and, in many embodiments, associated refinement data for improving the reconstruction $\hat{X}_{M_i}$ are sent in the bitstream to the decoder.

In some embodiments, a CRR-capable system may allow for refinement of a previously-refined sample. That is, a sample may be refined more than once. This may occur because the same sample may be used in more than one prediction operation. As an example, in inter-coded video a first reference block in a reconstructed frame may be used for predicting a block of pixels in a second frame. A second reference block in the reconstructed frame may be used to predict another block of pixels, and may have at least some overlap with the first reference block. The another block of pixels may be in the second frame or in a third frame. To the extent that the first and second reference blocks overlap, those pixels are used more than once to predict other pixels. In a CRR-capable system, the pixels of the first reference block may be refined during encoding/decoding of the block of pixels in the second frame. The refined first reference block is retained in memory, for example as part of the (now altered) reconstructed frame. When the another block of pixels is to be encoded/decoded, the encoder and decoder may refine the pixels of the second reference block. This may include refining the pixels in the overlapping area that were refined already.

In some embodiments the encoder and decoder may keep track of the number of times that a given sample (e.g. pixel) has been refined. This may be referred to as a generation count. For example, reconstruction $\hat{X}_k$ may be useful for predicting $X_j$, and thus for the reconstruction of $\hat{X}_j$. On this basis, reconstruction $\hat{X}_k$ may be refined to produce $\hat{X}'_k$, where the prime symbol indicates it has been refined once. Later in the coding process, it may be determined that $\hat{X}'_k$ is useful for predicting $X_l$. In some embodiments, the refined reconstruction $\hat{X}'_k$ may be further refined to produce $\hat{X}''_k$, where the double-prime symbol indicates a second refinement operation.

In one embodiment, the encoder and decoder may be configured to optionally apply the second refinement operation to both the refined reconstruction $\hat{X}'_k$ and to any reconstructed samples that were based on $\hat{X}'_k$ such as $\hat{X}_j$.

The encoder and/or decoder may be configured to retain all 'generations' of a reconstruction. In some embodiments, the encoder and/or decoder may be configured to retain only the 'original' reconstruction and the most-recently refined reconstruction. In yet other embodiments, the encoder and/or decoder may be configured to retain only the most-recently refined reconstruction.

In one example implementation, multiple generations may be retained for error control management or temporal layering. For example, if using a hierarchical GoP structure, such as one with temporal layers, where prediction occurs in one direction between the layers, then associating generations with the layers helps avoid or reduce the impact of picture loss (deliberate or accidental) in one layer affecting other layers.

The refinement data used to refine a reconstruction may, in some embodiments, include an error signal between the original source sample data and the reconstructed data. In such a case, the refinement operation may include adding the error signal to the reconstructed data being refined. The error signal may be transformed and/or quantized, perhaps with a finer quantization step size than was used in the original residual coding that led to the reconstructed data. In some embodiments, the refinement data may include data other than a residual/error signal. For example, the refinement data may include filter data for configuring a filter to be applied to the reconstruction in order to refine the reconstruction. In another example, refinement data may include control information that modifies the reconstruction process, which, in effect, changes the reconstruction.

The data output by the decoder may, in some embodiments, be the first generation reconstruction, i.e. the unrefined reconstruction. In this embodiment, the refinement of reconstructed samples does not impact the visual quality of the output reconstruction, but rather impacts the quality of the predictions used for subsequent reconstructions. In another embodiment sufficient delay may be incorporated into the output of the decoder to output the refined reconstructions. In yet another embodiment, the output may include refined reconstructions up to a delay point after which further refinements may occur but the output of those reconstructions has already occurred.

Using the same generalized source data mentioned above, in one example embodiment a CRR-capable encoder may encode an N-length set of sample, $X_{N(i-1)+1}, \ldots, X_{Ni}$, as follows. In this example, the encoder determines whether to encode the sample using CRR or not based on a cost analysis. The example below evaluates different possible predictions (indicated by prediction information $M_i$) both with and without CRR.

An index subset $Y_i$ may be selected of $\{1, 2, \ldots, N(i-1)\}$. For example, a typical choice for $Y_i$ may be the last K elements, e.g. $Y_i=\{N(i-1)-K, N(i-1)-K+1, \ldots, N(i-1)\}$. The encoder may then evaluate different possible ways of encoding the set of samples using, as an example, the following cost-based process:

1. Set index k=K and initialize the best cost $C_{best}$ to a large value that effectively appears as ∞.
2. For index k, evaluate both non-CRR and CRR cost:
   a. Set $M_i=(k, 0)$. Obtain $P_i=\hat{X}_{M_i}$, and $R_{N(i-1)+j}=P_i$, j=1, \ldots, N. Determine the cost $C_{k,0}$ of coding ($M_i$, $R_{N(i-1)+1} \ldots R_{Ni}$). Note that the coding of $R_{N(i-1)+1} \ldots R_{Ni}$ might be lossy.
   b. Set $M_i=(k, 1)$. Progressively update $\hat{X}_{M_i}$, obtain a new $R_{N(i-1)+j}=X_{N(i-1)+j}-\hat{X}_{M_i}$, and determine the sum cost $C_{k,1}$ of the progressive coding of $\hat{X}_{M_i}$ and coding the new ($M_i$, $R_{N(i-1)+1} \ldots R_{Ni}$).
3. Select and record the smaller cost between $C_{k,0}$ and $C_{k,1}$ in Step 2 above as $C_k$. If $C_k$ is less than $G_{best}$, set $G_{best}=C_k$, and record the corresponding coding decisions in Step 2, e.g. ($M_i$, $R_{N(i-1)+1} \ldots R_{Ni}$) and the information related to the retroactive update of $\hat{X}_{M_i}$ in Step 2b.
4. Decrement k by 1, and repeat Steps 2 and 3 until k=1.
5. Encode the ($M_i$, $R_{N(i-1)+1} \ldots R_{Ni}$) and if necessary, the refinement data (i.e., the meta information required to progressively update $\hat{X}_{M_i}$ in Step 2b) corresponding to $C_{best}$.

The progressive updating of $\hat{X}_{M_i}$ in Step 2b above (i.e. the refinement data) can be conveyed to the decoder in a form of lossy coding of $X_{M_i}-\hat{X}_{M_i}$ in Step 5. In an example case in which $X_{M_i}-\hat{X}_{M_i}$ itself is a block or a vector, it can be coded by using a method similar to that used to code $R_{N(i-1)+1} \ldots R_{Ni}$, with or without the involvement of transform and/or quantization.

Figure 5:
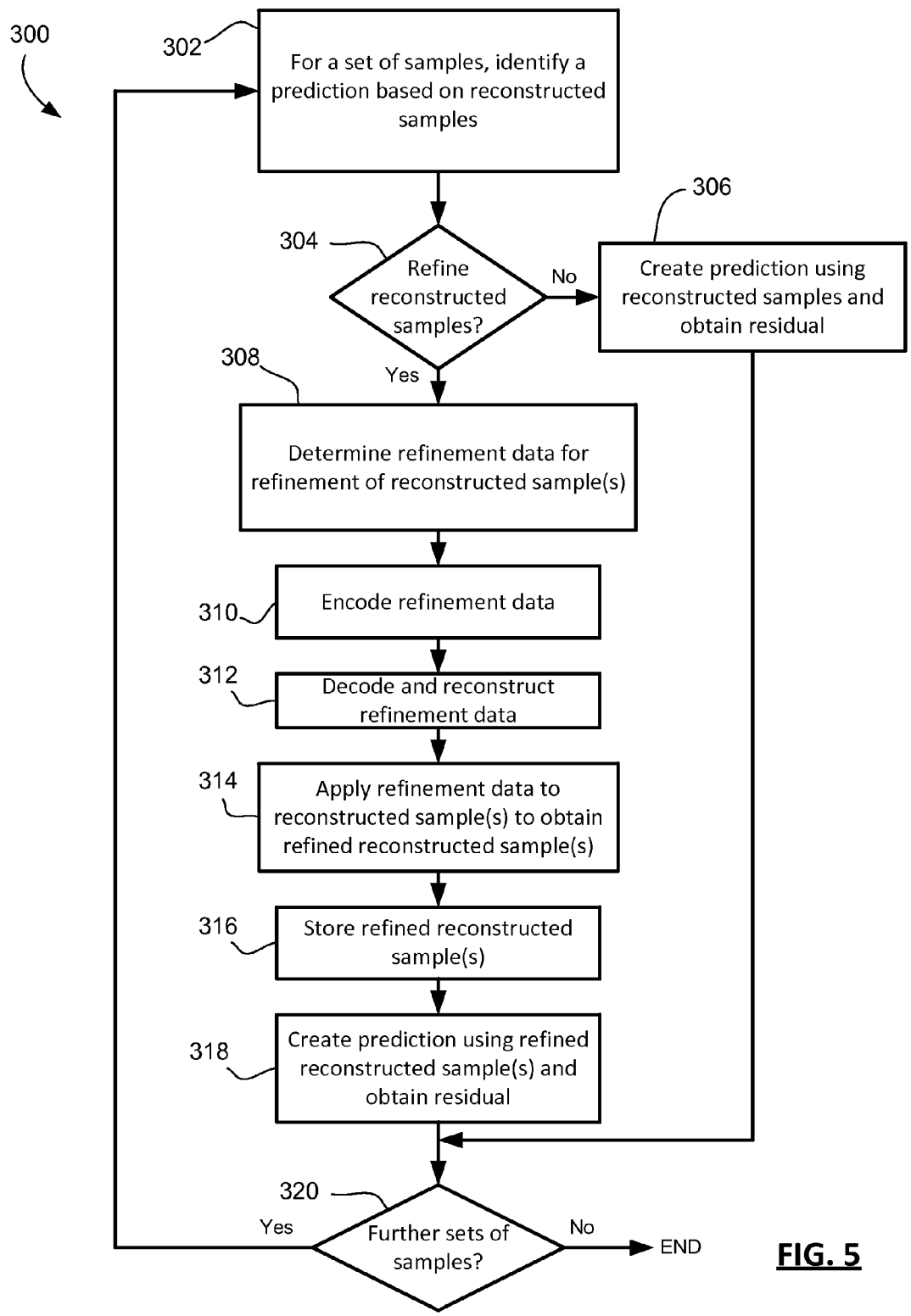
FIG. 5 shows a flowchart illustrating an example method for encoding media using conditional reconstruction refinement.

Reference is now made to FIG. 5, which shows, in flowchart form, one example of a method 300 of encoding a set of samples using on-demand progressive reconstruction. The set of samples may, in some embodiments, include a set of pixels, such as a block of pixel data. The pixel data may be luma data or chroma data.

In operation 302, the encoder identifies a prediction for the set of pixels based upon at least one reconstructed sample. The at least one reconstructed sample is a previously-encoded and decoded sample. If the samples are video, the prediction operation may be an inter-picture prediction or an intra-picture prediction. The prediction identified in operation 302 may result from a search for a best or optimal prediction within a search window. This may include rate-distortion cost-based searching across various candidate modes and/or motion vectors. The present application is not limited to any particular type of prediction operation and may be used with any prediction that is based upon previously-reconstructed samples.

In operation 304, the encoder determines whether to refine the reconstructed sample(s) that is/are the basis for the prediction. There are various mechanisms that the encoder may use to determine whether to refine a reconstruction. In some cases, CRR may be disabled for the given set of samples based on a policy or flag set higher in the encoding process. For example, in video coding the encoder may be configured to determine at a GoP, picture, frame, slice, or coding unit level whether CRR is enabled. In some other cases, CRR may be disabled for the encoder in certain circumstances, such as if delay restrictions, computational limitations, and/or bandwidth limitations make CRR less desirable. Some example details are given later below regarding the various flags and/or limits that may be applied to CRR to control its application.

In some cases, the encoder may make the determination in operation 304 based upon a cost analysis of refining the reconstruction versus not refining the reconstruction. The details of such a cost analysis may vary widely depending on the implementation.

In any event, if the encoder determines that the reconstruction is not to be refined, then in operation 306 the encoder obtains residual data from the difference between the source set of samples and the prediction. The residual data and prediction information is encoded, which may include transform, quantization and entropy coding operations.

If the encoder determines in operation 304 that the reconstruction is to be refined, then in operation 308 it generates refinement data for refining the reconstructed sample(s). The refinement data may be generated in any one of a number of ways. One option is to find the residual between the reconstructed sample(s) and the original data sample(s) for the reconstructed sample(s). That residual then becomes the refinement data or the source of the refinement data. As noted above, in some cases, instead of residual data the refinement data may be filter information (linear or non-linear) or control information that modifies the reconstruction process (e.g. selectively turning on/off a deblocking or SAO filter, selecting a different quantization matrix, etc.).

It will be appreciated that the refinement data is not necessarily based on a comparison between the reconstructed sample(s) and the original data sample(s), since the goal of refinement is not necessarily to make the reconstructed sample look more like the original, but to make it more effective for prediction. Accordingly, the refinement may be based on derivation of an "ideal" prediction. As an example, in the case of intra prediction a one-dimensional sequence of reconstructed samples is used to predict a nearby two-dimensional block of samples. The reference sample used to predict n samples in the two-dimensional block may be refined to have a value based on a regression model over the n samples it is supposed to predict. If the refined reconstructed sample is intended for output, then the process of determining refinement data may include evaluating a rate-distortion cost that includes the distortion introduced (or corrected) in the refined reconstructed sample.

The refinement data is then encoded in operation 310 and decoded in operation 312 to produce reconstructed refinement data. The encoding operation 310 may be a lossy encoding (otherwise, it would not be necessary to encode and decode the refinement data before applying it in the encoder). In some cases, the refinement data may be transformed and/or quantized. If quantized, the quantization may use a smaller step size than was used when the original residual data for reconstructed sample(s) was/were encoded.

In operation 314, the reconstructed refinement data is applied to refine the reconstructed sample(s). In some implementations, the refinement is an addition operation in which reconstructed refinement data is added to the reconstructed sample(s), although the present application is not limited to such an operation. The resulting refined reconstructed sample(s) is/are stored in memory in operation 316.

In operation 318, the refined reconstructed sample(s) is/are used as the basis for generating a prediction using the prediction information identified in operation 302. From the prediction and the original set of samples, the encoder calculates residual data. The residual data, prediction information and refinement data is encoded for transmission to a decoder.

At operation 320, the encoder determines whether there are further set of samples to be encoded and, if so, returns to operation 302.

Figure 6:
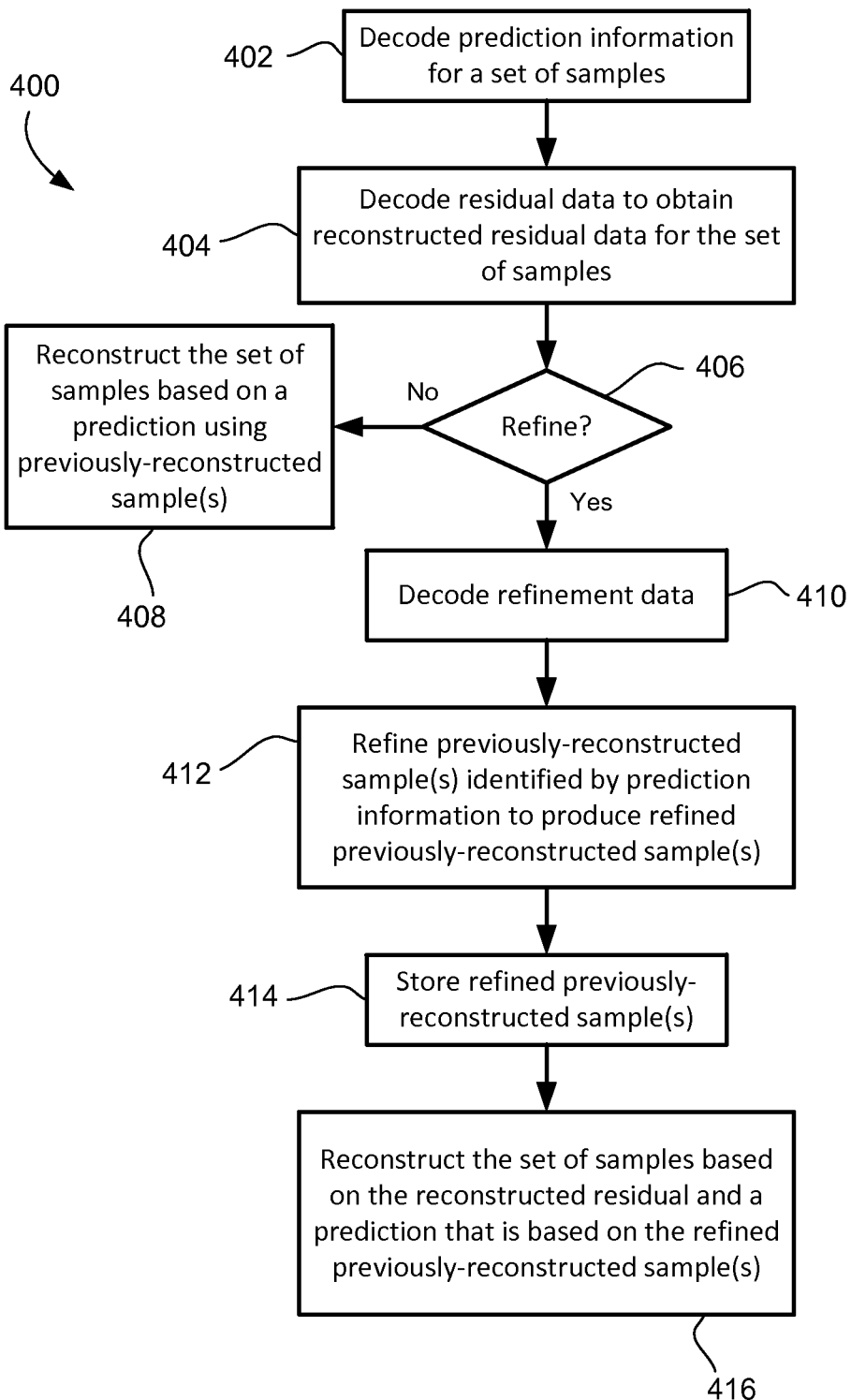
FIG. 6 shows a flowchart illustrating an example method for decoding media encoded using conditional reconstruction refinement.

Reference will now be made to FIG. 6, which shows, in flowchart form, an example method 400 for decoding CRR encoded data. The bitstream of encoded data relates to a set of samples and includes residual data and prediction information for that set of samples. The prediction information identifies one or more previously-reconstructed samples. In some instances, the encoded data may also include refinement data for refining the one or more previously-reconstructed samples.

The method 400 includes operations 402 and 404, in which the prediction information is decoded from the bitstream and the residual data is decoded. Decoding of the residual data includes reconstructing the residual data to create reconstructed residual data. As noted above, the prediction information identifies at least one previously-reconstructed sample that serves as the basis for forming a prediction of the set of samples. In the case of video, for example, the prediction information may include partition data, an intra-coding mode, a motion vector, etc. For example, an intra-coding mode indicates a prediction direction that determines which of the neighboring reconstructed samples are used to generate predictions for the set of samples. As another example, a motion vector specifies a reference frame/picture and the vector data for locating the corresponding reference block in that frame that serves as the prediction for the set of samples. The reference block contains previously-reconstructed samples.

At operation 406, the decoder determines whether to refine the previously-reconstructed samples. Note that the decoder identifies the previously-reconstructed samples based on the prediction information decoded from the bitstream. The determination to refine those particular reconstructed samples is, thus, partly based upon the prediction information. It may further be based upon any flags or policies that determine under what circumstances CRR is to be applied. Example flags and policies are described further below. Irrespective of the mechanism, the decoder identifies the previously-reconstructed samples based on the prediction information and determines whether to refine them.

If the decoder determines that the previously-reconstructed samples are not to be refined, then in operation 408 the decoder performs normal reconstruction of the set of samples. That is, the decoder generates a prediction based on the previously-reconstructed samples and the prediction information. The prediction is then combined with the reconstructed residual data to generate the reconstructed set of samples.

If the previously-reconstructed samples are to be refined, then in operation 410, the decoder decodes refinement data from the bitstream. As discussed above, the refinement data may be encoded using lossy or lossless encoding. In some cases, the refinement data may be transformed and/or quantized prior to entropy encoding. In those cases, the decoder applies inverse transform and/or inverse quantization operations to reconstruct the refinement data.

In operation 412, the previously-reconstructed samples identified by the prediction information for the set of samples are refined using the reconstructed refinement data. The refinement of the previously-reconstructed samples results in refined previously-reconstructed samples. The refined previously-reconstructed samples are stored in memory in operation 414. As described above, the refined previously-reconstructed samples may be stored in place of the previously-reconstructed samples, or may be stored in addition to the previously-reconstructed samples.

In operation 416, the decoder reconstructs the set of samples by generating a prediction for the set of samples using the decoded prediction information and the refined previously-reconstructed samples. The decoder then combines the prediction and the reconstructed residual data to generate the reconstructed set of samples.

As mentioned above, CRR may be allowed in certain situations and disabled in other situations. For example, it may be desirable to provide a mechanism for ensuring that a portion of the reconstructed data (e.g. in the case of video, a picture or part of a picture) is not allowed to be refined. In another example, it may be desirable to provide a mechanism for ensuring that a particular portion of the data (e.g. in the case of video, a picture of part of a picture) is not permitted to refine previously-reconstructed data, i.e. it cannot be encoded with associated refinement data.

In the first situation, a flag or policy may indicate that a portion of reconstructed data cannot be refined (or further refined). An example flag associated with the portion of reconstructed data may be set to zero if refinement is prohibited and may be set to one if refinement (or further refinement) is permitted. As an alternative to flags, or in addition to flags, a policy may provide that a reconstructed sample may only be refined a predetermined number of times. Thus, any samples that have been refined the predetermined number of times would not be eligible for further refinement.

In the second situation noted above, where a portion of the data is not permitted to refine previously-reconstructed data, a flag may be associated with the portion of the data (e.g. a picture, slice, coding unit, etc.) that indicates whether the portion of the data is using CRR or not. The flag indicates whether CRR is used in encoding the portion of the data and, thus, whether refinement data may be expected in the bitstream for refining the previously-reconstructed data identified by the prediction information.

Either of the above-described flags may be implemented in a hierarchical partitioning of the source data. For example, in the case of video, the hierarchy may include a GoP, individual pictures, slices within pictures, coding units (CU) within slices or pictures, etc. A flag that indicates CRR is disabled at the GoP level may apply to the entire GoP and no further CRR-related flags need be encoded/decoded. On the other hand, if a flag at the GoP level indicates CRR is enabled, there may be further flags at the picture level, such as in a picture parameter set, to indicates whether CRR is enabled for that picture. Similarly, if enabled for a picture, then additional flags may be present in the slice header or CU header to indicate whether CRR is enabled for that slice or CU. The use of flags may further be constrained by a policy that limits the granularity of the flags. As an example, CRR-related flags at the CU level may be restricted to CUs that are 16×16 or larger; smaller CUs may inherit the properties of the next layer up in the hierarchy.

In one example embodiment, an integer-valued syntax element, here labeled "max_refine", may be signaled in relation to the data (or a portion of the data). The syntax element indicates the maximum number of times that a reconstructed sample may be refined. Example settings for max_refine are:
- −1: no limit
- 0: disable CRR
- 0<n<T: n indicates the value of max_refine. T is a threshold value to allow correct decoding of max_refine. May be coded using variable length or arithmetic coding in some instances.

In some cases, max_refine may have a default or inferred value if it is not signaled in the bitstream. In some cases, the inferred value of max_refine may be associated with certain other coding parameters. For example, in the case of video coding each different coding profile/level setting (e.g. H.264/AVC Main Profile) may be associated with a particular max_refine value.

In some example implementations relating to video, CRR control may be enabled via syntax flags in the bitstream based on one or more of the following parameters:
- Intra only, Intra/inter
- Luma only Luma/chroma
- Conditional on TU/CU sizes
- Conditional on extended chroma format.

In some example embodiments, CRR may be incorporated into scalable encoding/decoding. In general, the scalable coding framework may include spatial, temporal, intra BL spatial or quality scalability. Examples are outlined below with respect to spatial scalability specifically, but the present application is not necessarily limited to spatial scalability.

In the most general sense, CRR may be applied to any reconstruction that is used as the basis for a prediction in a scalable coder. Some possible implementations include:
1. CRR applied to base layer reconstruction used for prediction of enhancement layer data, but not within the base layer.
2. CRR applied to enhancement layer reconstructions used for prediction within the enhancement layer.
3. CRR applied to both base layer reconstructions and enhancement layer reconstructions used for prediction within the enhancement layer, and not within the base layer.
4. CRR applied to base layer reconstructions used for prediction in the base layer.
5. CRR applied to both base layer reconstructions and enhancement layer reconstructions for predictions in either the base layer or the enhancement layer.

In a first example of scalable coding, the lower or base layer may not be CRR-capable. The lower or base layer may be coded using, for example, H.264/AVC or H.265, in the case of video data. At the enhancement layer, CRR is applied to upsampled base layer pixels. In some examples, CRR may be applied based on scaled motion compensation information and/or scaled intra-prediction information. The enhancement layer encoding includes encoding of refinement data. In some implementations, the encoding of the refinement data may further indicate for which layers the refinement data is applied, since there may be more than one enhancement layer. In other implementations, other signaling within the bitstream (e.g. the flags discussed above) may indicate whether refinement data can be expected for a given layer. In yet other implementations, the decoder may infer whether refinement data is to be expected for a specific prediction within a specific enhancement layer based upon predefined policies or policies signaled in a header (e.g. a sequence header or picture header).

Figure 7:
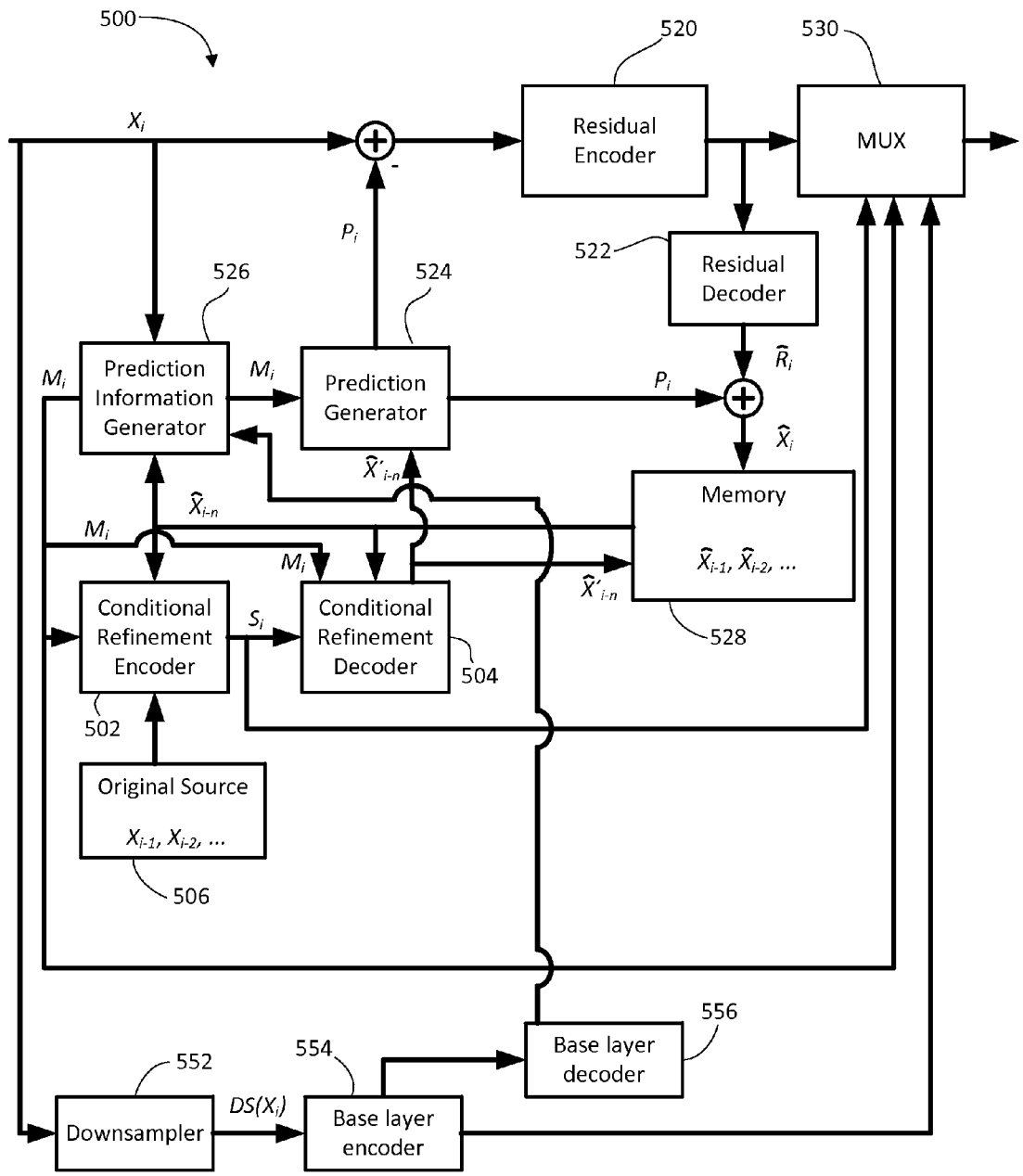
FIGS. 7 and 8 show, in block diagram form, example encoders for scalable video coding using conditional reconstruction refinement.

A block diagram of an example ODRP-enabled scalable encoder 500 is shown in FIG. 7. The source samples $X_i$ are downsampled in a downsampler 552 to create base-layer resolution samples $DS(X_i)$, which are then encoded in a base-layer encoder 554. The base-layer encoder 554 may be configured to encode the base-layer resolution data using, for example, H.264 or H.265 compliant encoding. In other implementations, other video coding standards may be used for the base layer.

The encoded base-layer data is then sent to a multiplexer 530 and to a base-layer decoder 556. Note that FIG. 7 shows the base-layer decoder 556 as a separate decoder from the base-layer encoder 554 for ease of explanation; however, it will be appreciated that in many implementations, the base-layer decoder 556 may be the base-layer decoder within the feedback loop inside the base-layer encoder 554. The base-layer decoder 556 creates reconstructed base-layer samples/data. In many implementations, the base-layer decoder 556 may further include an upsampler for upsampling the base-layer reconstruction to the enhancement layer resolution. In the illustrated example, the enhancement layer is at full-resolution, it will be appreciated that the enhancement layer may be a downsampled version of the full-resolution original, but at a resolution higher than the base layer.

The enhancement layer includes a residual encoder 520, a residual decoder 522, memory 528, a prediction information generator 526, a prediction generator 524, a conditional refinement encoder 502, a conditional refinement decoder 504, and memory 506 containing original source samples/data.

In accordance with scalable coding frameworks, the upsampled reconstructed base-layer samples are provided to the enhancement-layer coding stage for incorporation into the prediction process. In some embodiments, the upsampled reconstructed base-layer samples may be used by both the prediction generator 524 and/or prediction information generator 526 as a predicted frame/block. After subtracting the actual enhancement layer source data $X_i$ from the predicted frame/block a residual is left. This residual is the data encoded by the enhancement layer encoding process and is the data subjected to a prediction operation carried out by the prediction information generator 526 and the prediction generator 524.

Within the enhancement layer encoding process, the enhancement layer reconstructions may be refined by the conditional refinement encoder 502 and a conditional refinement decoder 504 to realize a refined enhancement-layer reconstruction, as described above in connection with the single-layer embodiment illustrated in FIG. 3. It will be understood that in this example that the process does not affect the output from the base-layer encoding stage.

In a second example of scalable coding, both the base-layer encoding process and the enhancement-layer encoding process are CRR-capable. At the base-layer, CRR is applied to base-layer reconstructions and base-layer refinement data is generated for refining base-layer reconstructions. At the enhancement layer, the base-layer reconstructions may be refined prior to upsampling. At the enhancement layer, a further CRR refinement of enhancement layer reconstructions and/or the upsampled refined base-layer reconstruction may be applied.

Figure 8:
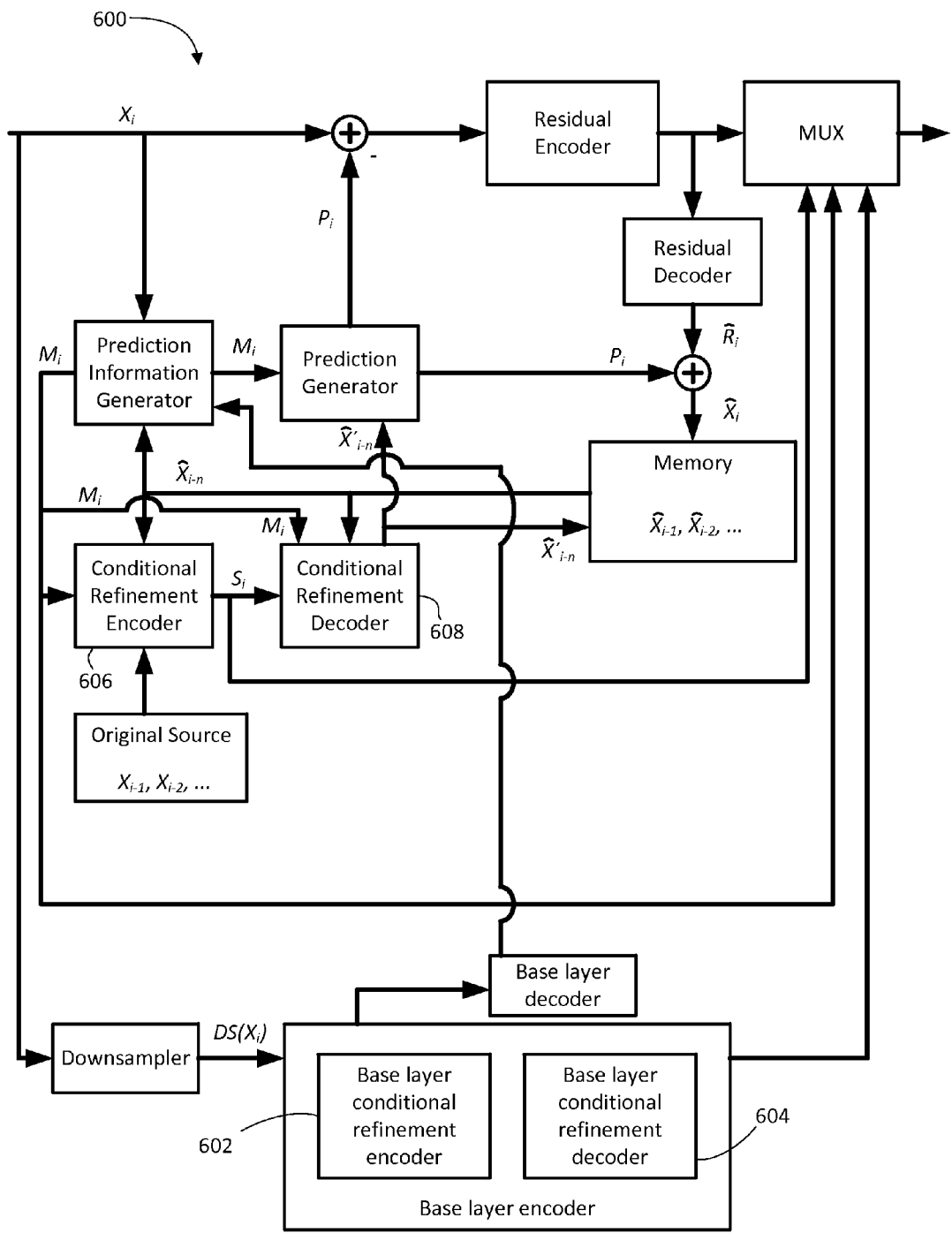

Reference is made to FIG. 8, which shows an example scalable encoder 600 configured to apply CRR at the base layer and enhancement layer. In this case, the base-layer encoding section includes a base-layer conditional refinement encoder 602 and a base-layer conditional refinement decoder 604, and the enhancement-layer encoding section includes an enhancement-layer conditional refinement encoder 606 and an enhancement-layer conditional refinement decoder 608. The base-layer conditional refinement encoder 602 may refine a reconstructed set of base-layer samples on the basis that those samples are used in a prediction operation within the base-layer encoding. In some embodiments, the coding of the enhancement layer may be delayed to ensure the predictions at the enhancement layer take advantage of any refinements made to reconstructions at the base layer. In some other embodiments, the coding of the enhancement layer may only use unrefined base-layer reconstructions.

At the enhancement layer, as described above in connection with FIG. 7, the residual sample data at the enhancement layer is encoded using a prediction operation and the enhancement-layer reconstruction may be refined by the enhancement-layer conditional refinement encoder 606 on the basis that the enhancement-layer reconstruction is used in the prediction operation for subsequently encoded enhancement-layer data.

In a variation of the scalable encoders 500 and 600 described above, CRR may be applied to the upsampled base-layer reconstruction used to predict the enhancement layer on the basis that it is being used in a prediction operation. Note, however, that the refinement is therefore essentially enhancement-layer data.

In a third example of scalable coding, the upsampled base-layer reconstruction may be subjected to CRR refinement at the enhancement layer. If an upsampled base-layer reconstruction is refined, then the refined upsampled base-layer may be down-sampled and used in place of the first reconstruction of that base-layer data. The refined downsampled data may be used as the basis for base-layer predictions and/or may be output as the base-layer video reconstruction, depending on the implementation.

It will also be understood that CRR may be incorporated into scalable coding in situations other than spatial scaling. For example, in the case of temporal scalability, CRR may be applied to reference frame(s) used in temporal scalability.

Figure 9:
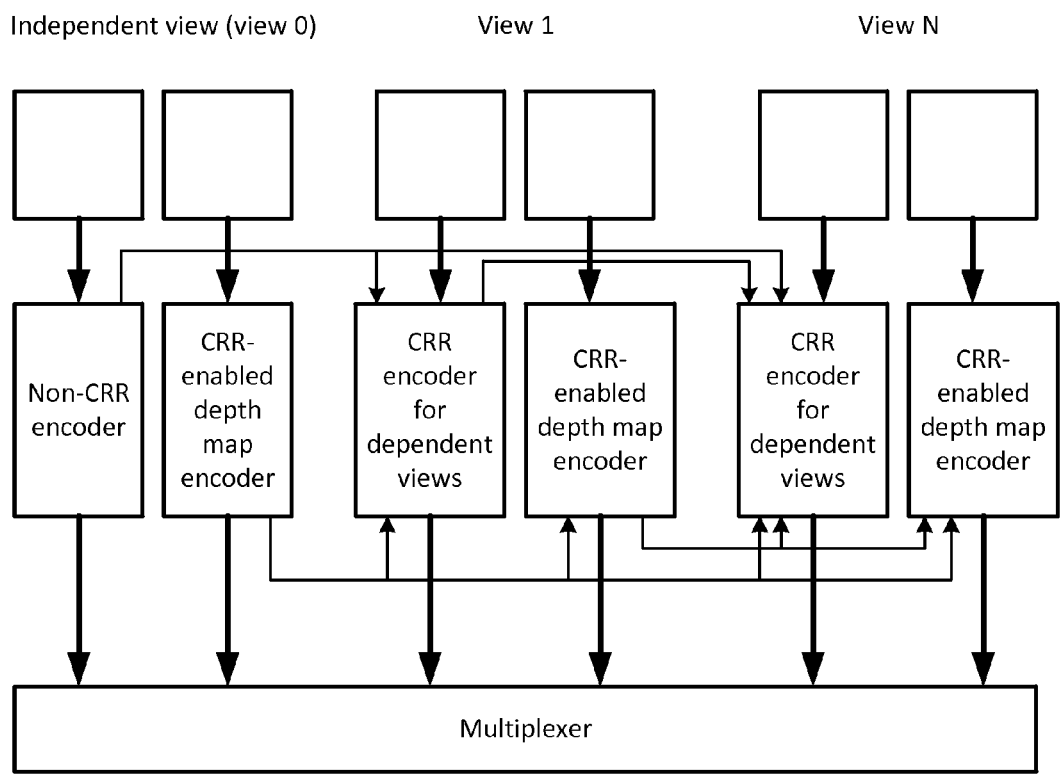
FIG. 9 diagrammatically illustrates an example encoder for 3-dimensional or multi-view coding using conditional reconstruction refinement.

CRR may also be incorporated into 3-dimensional (3D) coding processes (multi-view and depth coding). For example, in one case the independent view coding process is not CRR-capable, whereas the dependent views are CRR-capable. Reference is now made to FIG. 9, which shows, in block diagram form, an example 3D encoder 700.

In the example 3D encoder 700, includes a non-CRR-capable encoder 702 for the independent view data (view 0). That data is used by the dependent view coders 704, 706 (only two illustrated in this embodiment). In this example, the encoder 700 includes depth map encoders. In particular, each of the depth map encoders is CRR-capable, include the independent view depth map encoder 708, and the dependent view depth map encoders 710, 712.

In some other embodiments, the independent view encoder may also be CRR-capable. In some embodiments, CRR is used only for view encoders, or only for depth map encoders. Other variations will be appreciated in light of the foregoing description.

Figure 10:
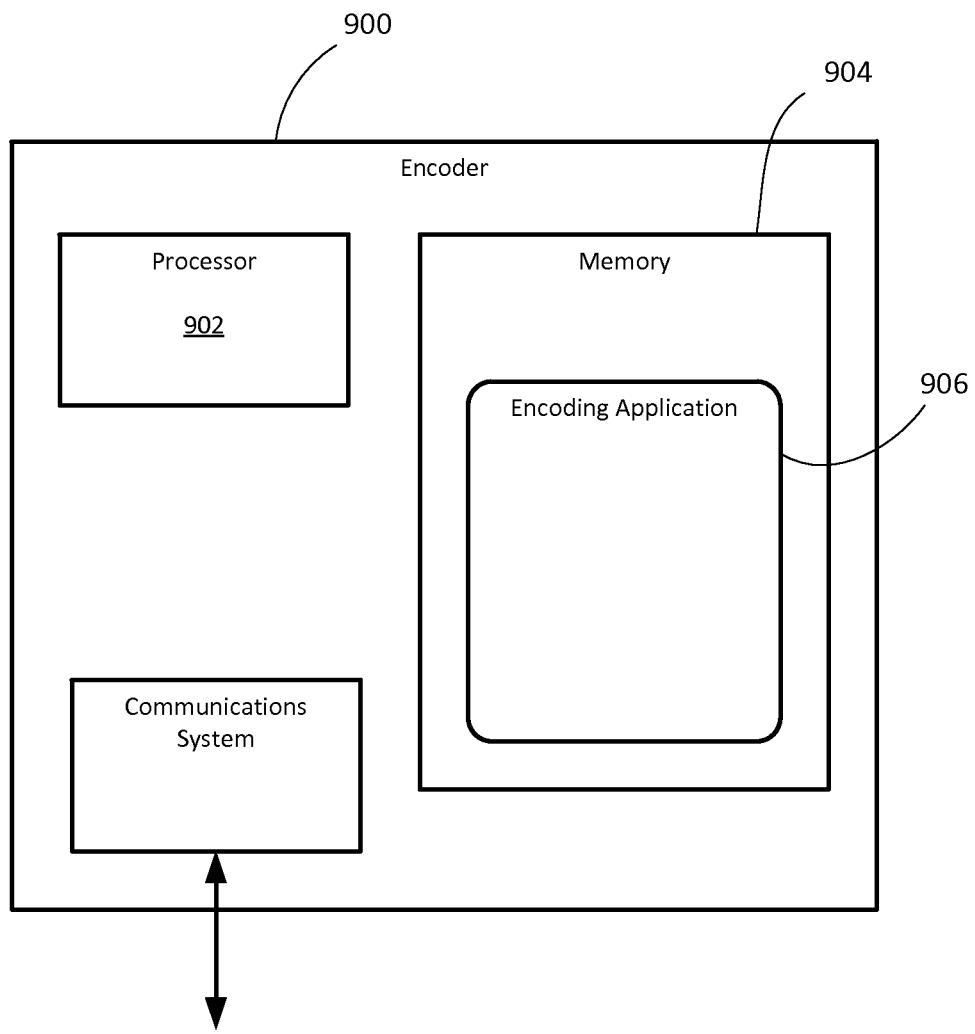
FIG. 10 shows a simplified block diagram of an example embodiment of an encoder.

Reference is now made to FIG. 10, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 11:
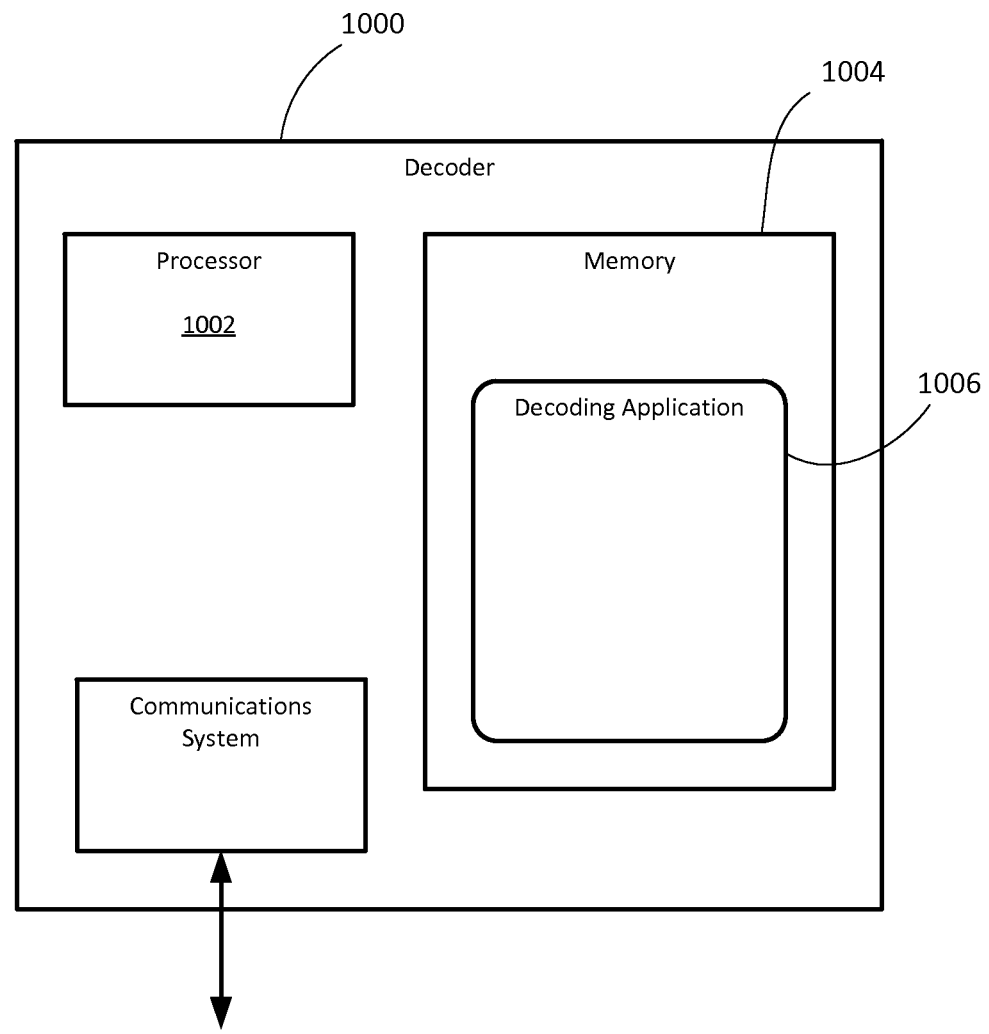
FIG. 11 shows a simplified block diagram of an example embodiment of a decoder.

Reference is now also made to FIG. 11, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding data from a bitstream of encoded data using a decoder, the method comprising:
   decoding residual data for a first set of samples and reconstructing the first set of samples based on a prediction to produce a set of reconstructed samples;
   decoding prediction information for a second set of samples wherein the prediction information specifies a prediction operation involving one of the reconstructed samples from the set of reconstructed samples; and,
determining to refine the reconstructed sample, and based on that determination,
    decoding refinement data for that reconstructed sample,
    modifying that reconstructed sample using the refinement data to produce a refined reconstructed sample, and
    storing the refined reconstructed sample for subsequent prediction operations.

2. The method claimed in claim 1, further comprising:
generating a predicted second set of samples based on the refined reconstructed sample and the prediction information; and
reconstructing the second set of samples based on the predicted second set of samples.

3. The method claimed in claim 1, wherein the prediction information identifies source data for predicting the second set of samples, and wherein the source data includes said one of the reconstructed samples.

4. The method claimed in claim 3, wherein the data comprises video, and wherein the prediction information identifies one of an intra-coding mode and a motion vector.

5. The method claimed in claim 1, wherein determining to refine includes determining that conditional refinement is enabled based on at least one decoded flag from the bitstream.

6. The method claimed in claim 5, wherein the at least one decoded flag indicates that conditional refinement is enabled with respect to said one of the reconstructed samples.

7. The method claimed in claim 5, wherein the at least one decoded flag indicates that refinement of reconstructed samples is permitted in association with reconstruction of the second set of samples.

8. The method claimed in claim 1, wherein the refinement data comprises refined residual data, and wherein modifying said one of the reconstructed samples includes adding the refined residual data to that reconstructed sample.

9. The method claimed in claim 1, further comprising:
decoding further prediction information for a third set of samples; and
determining that the further prediction information specifies a prediction operation involving said one of the reconstructed samples and, based on that determination,
    decoding further-refinement data for that reconstructed sample, and
    modifying said refined reconstructed sample using the further-refinement data to produce a further-refined reconstructed sample.

10. A method of encoding source data using an encoder, the method comprising:
encoding residual data for a first set of samples from the source data;
decoding the residual data and reconstructing the first set of samples based on its prediction to produce a set of reconstructed samples;
determining prediction information for a second set of samples, wherein the prediction information specifies a prediction operation involving one of the reconstructed samples from the set of reconstructed samples; and,
determining to refine the reconstructed sample, and based on that determination,
    generating refinement data for that reconstructed sample from said first set of samples,
    encoding and decoding that refinement data to obtain reconstructed refinement data,
    modifying that reconstructed sample using the reconstructed refinement data to produce a refined reconstructed sample, and
    storing the refined reconstructed sample for subsequent prediction operations.

11. The method claimed in claim 10, further comprising:
generating a predicted second set of samples based on the refined reconstructed sample and the prediction information;
determining second residual data from the predicted second set of samples and the second set of samples; and
encoding the second residual data, the refinement data, and the prediction information.

12. The method claimed in claim 10, wherein the prediction information identifies source data for predicting the second set of samples, and wherein the source data includes said one of the reconstructed samples.

13. The method claimed in claim 12, wherein the data comprises video, and wherein the prediction information identifies one of an intra-coding mode and a motion vector.

14. The method claimed in claim 10, wherein determining to refine includes determining that conditional refinement is enabled and encoding at least one flag indicating that conditional refinement is enabled.

15. The method claimed in claim 14, wherein the at least one flag indicates that conditional refinement is enabled with respect to said one of the reconstructed samples.

16. The method claimed in claim 14, wherein the at least one flag indicates that refinement of reconstructed samples is permitted in association with reconstruction of the second set of samples.

17. The method claimed in claim 10, wherein the reconstructed refinement data comprises refined residual data, and wherein modifying said one of the reconstructed samples includes adding the refined residual data to that reconstructed sample.

18. The method claimed in claim 10, further including:
selecting further prediction information for a third set of samples; and
determining that the further prediction information specifies a prediction operation involving said one of the reconstructed samples and, based on that determination,
    generating further-refinement data for that reconstructed sample from said first set of samples,
    encoding and decoding that further-refinement data to obtain reconstructed further-refinement data, and
    modifying that refined reconstructed sample using the reconstructed further-refinement data to produce a further-refined reconstructed sample.

19. A decoder for decoding a bitstream of encoded data, the decoder comprising:
a processor;
a memory; and
a decoding application stored in memory and containing instructions for causing the processor to perform the method claimed in claim 1.

20. The decoder claimed in claim 19, wherein the instructions are further for causing the processor to:
generate a predicted second set of samples based on the refined reconstructed sample and the prediction information; and
reconstruct the second set of samples based on the predicted second set of samples.

21. The decoder claimed in claim 19, wherein the prediction information identifies source data for predicting the second set of samples, and wherein the source data includes said one of the reconstructed samples.

22. The decoder claimed in claim 21, wherein the data comprises video, and wherein the prediction information identifies one of an intra-coding mode and a motion vector.

23. The decoder claimed in claim 19, wherein the processor determines to refine by determining that conditional refinement is enabled based on at least one decoded flag from the bitstream.

24. The decoder claimed in claim 23, wherein the at least one decoded flag indicates that conditional refinement is enabled with respect to said one of the reconstructed samples.

25. The decoder claimed in claim 23, wherein the at least one decoded flag indicates that refinement of reconstructed samples is permitted in association with reconstruction of the second set of samples.

26. The decoder claimed in claim 19, wherein the refinement data comprises refined residual data, and wherein the processor modifies said one of the reconstructed samples by adding the refined residual data to that reconstructed sample.

27. The decoder claimed in claim 19, wherein the instructions are further for causing the processor to:
  decode further prediction information for a third set of samples; and
  determine that the further prediction information specifies a prediction operation involving said one of the reconstructed samples and, based on that determination,
    decode further-refinement data for that reconstructed sample, and
    modify said refined reconstructed sample using the further-refinement data to produce a further-refined reconstructed sample.

28. An encoder for encoding data, the encoder comprising:
  a processor;
  a memory; and
  an encoding application stored in memory and containing instructions for causing the processor to perform the method claimed in claim 10.

29. The encoder claimed in claim 28, wherein the instructions are further for causing the processor to:
  generate a predicted second set of samples based on the refined reconstructed sample and the prediction information;
  determine second residual data from the predicted second set of samples and the second set of samples; and
  encode the second residual data, the refinement data, and the prediction information.

30. The encoder claimed in claim 28, wherein the prediction information identifies source data for predicting the second set of samples, and wherein the source data includes said one of the reconstructed samples.

31. The encoder claimed in claim 30, wherein the data comprises video, and wherein the prediction information identifies one of an intra-coding mode and a motion vector.

32. The encoder claimed in claim 28, wherein the processor determines to refine by determining that conditional refinement is enabled and encoding at least one flag indicating that conditional refinement is enabled.

33. The encoder claimed in claim 32, wherein the at least one flag indicates that conditional refinement is enabled with respect to said one of the reconstructed samples.

34. The encoder claimed in claim 32, wherein the at least one flag indicates that refinement of reconstructed samples is permitted in association with reconstruction of the second set of samples.

35. The encoder claimed in claim 28, wherein the reconstructed refinement data comprises refined residual data, and wherein the processor modifies said one of the reconstructed samples by adding the refined residual data to that reconstructed sample.

36. The encoder claimed in claim 28, wherein the instructions are further for causing the processor to:
  select further prediction information for a third set of samples; and
  determine that the further prediction information specifies a prediction operation involving said one of the reconstructed samples and, based on that determination,
    generate further-refinement data for that reconstructed sample from said first set of samples,
    encode and decode that further-refinement data to obtain reconstructed further-refinement data, and
    modify that refined reconstructed sample using the reconstructed further-refinement data to produce a further-refined reconstructed sample.

37. A non-transitory processor-readable medium storing processor-executable instructions which, when executed, configure one or more processors to perform the method claimed in claim 1.

38. A non-transitory processor-readable medium storing processor-executable instructions which, when executed, configure one or more processors to perform the method claimed in claim 10.

* * * * *